(12) United States Patent
Giraudet

(10) Patent No.: US 7,656,581 B2
(45) Date of Patent: Feb. 2, 2010

(54) TRANSPARENT AND POLARIZING VIEWING ELEMENT HAVING A ZONE ASSOCIATED WITH AN OBLIQUELY ORIENTED POLARIZING FILTER

(75) Inventor: Guillaume Giraudet, Pontault-Combault (FR)

(73) Assignee: Essilor International (compagnie Generale D'optique), Charenton-Le-Pont (FR)

(*) Notice: Subject to any disclaimer, the term of this patent is extended or adjusted under 35 U.S.C. 154(b) by 385 days.

(21) Appl. No.: 10/594,604

(22) PCT Filed: Mar. 29, 2005

(86) PCT No.: PCT/FR2005/000750
§ 371 (c)(1),
(2), (4) Date: Sep. 28, 2006

(87) PCT Pub. No.: WO2005/101099
PCT Pub. Date: Oct. 27, 2005

(65) Prior Publication Data
US 2007/0146574 A1    Jun. 28, 2007

(30) Foreign Application Priority Data
Apr. 2, 2004    (FR) ................... 04 03510

(51) Int. Cl.
*G02B 5/30* (2006.01)
*G02C 7/12* (2006.01)
(52) U.S. Cl. .......... 359/489; 351/49; 351/163; 351/165
(58) Field of Classification Search ........ 359/489, 359/493, 501; 351/49, 163, 165
See application file for complete search history.

(56) References Cited

U.S. PATENT DOCUMENTS

| 2,120,365 | A | * | 6/1938 | Kriebel | 351/49 |
| 2,301,126 | A |   | 11/1942 | Kriebel | |
| 2,334,446 | A |   | 11/1943 | Serell | |
| 2,378,493 | A | * | 6/1945 | Miles | 351/49 |
| 2,472,731 | A | * | 6/1949 | Splaine | 351/60 |
| 2,773,422 | A | * | 12/1956 | Flynn, Sr. et al. | 351/49 |
| 3,211,047 | A |   | 10/1965 | Heimberger | |

(Continued)

FOREIGN PATENT DOCUMENTS

DE    10237684    3/2004

(Continued)

OTHER PUBLICATIONS

International Search Report 2688554, 2004.

(Continued)

*Primary Examiner*—Ricky D Shafer
(74) *Attorney, Agent, or Firm*—Occhiuti Rohlicek & Tsao LLP

(57) ABSTRACT

The invention concerns a transparent and polarizing viewing element (2) divided into several zones (2a, 2b). At least one of the zones (2a) is associated with a light polarizing filter. The light passing through the optical surface is affected differently for two of said zones (2a, 2b) depending on the polarizing direction of said light. The polarizing filter is obliquely oriented relative to a horizontal direction (H) in the operational position of the element (2; 5), with an angle between the filter orientation and said horizontal direction of 90 degrees and of 0 degree.

15 Claims, 2 Drawing Sheets

U.S. PATENT DOCUMENTS

| | | | |
|---|---|---|---|
| 3,423,149 A * | 1/1969 | Braunhut | 351/49 |
| 3,838,913 A | 10/1974 | Schwarz | |
| 4,047,249 A * | 9/1977 | Booth | 2/10 |
| 4,285,577 A * | 8/1981 | Schuler | 359/500 |
| 4,431,265 A * | 2/1984 | Benton | 359/465 |
| 4,678,296 A * | 7/1987 | Smith | 351/45 |
| 4,902,112 A * | 2/1990 | Lowe | 359/489 |
| 5,142,411 A | 8/1992 | Fiala | |
| 5,252,997 A * | 10/1993 | Christenbery | 351/49 |
| 5,765,235 A * | 6/1998 | Arnold | 2/424 |
| 6,250,759 B1 | 6/2001 | Kerns, Jr. et al. | |
| 7,572,006 B2 * | 8/2009 | Begon et al. | 351/163 |
| 2005/0099588 A1 * | 5/2005 | Helpern et al. | 351/44 |
| 2007/0177099 A1 | 8/2007 | Begon et al. | |
| 2008/0252846 A1 | 10/2008 | Biver et al. | |

FOREIGN PATENT DOCUMENTS

FR         2722581         1/1996

OTHER PUBLICATIONS

International Search Report PCT/2005/000750, 2005.

* cited by examiner

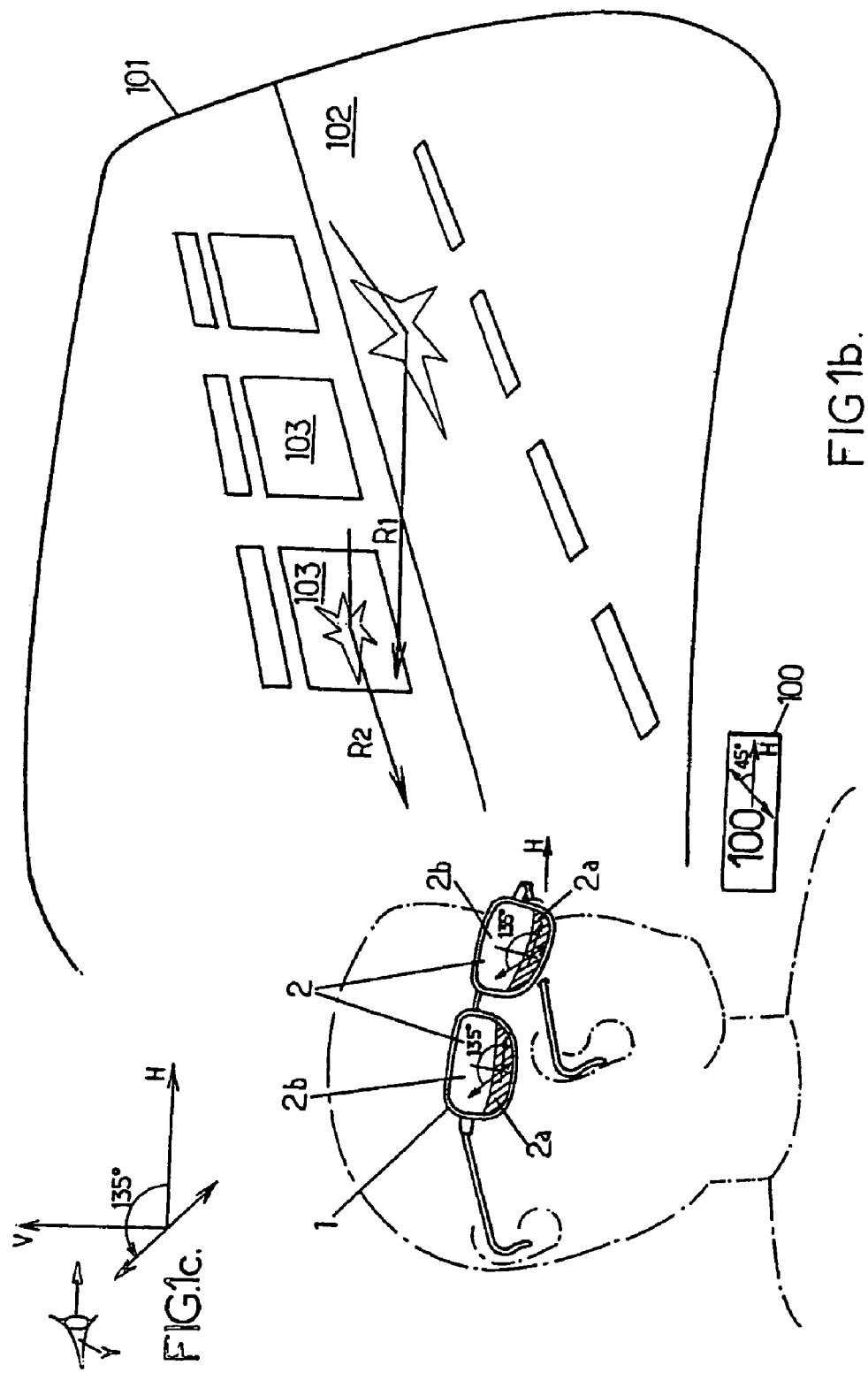

TRANSPARENT AND POLARIZING VIEWING ELEMENT HAVING A ZONE ASSOCIATED WITH AN OBLIQUELY ORIENTED POLARIZING FILTER

CROSS-REFERENCE TO RELATED APPLICATIONS

This application is the National Stage of International Application No. PCT/FR2005/000750, filed on Mar. 29, 2005, which claims the benefit of French Application Serial No. 0403510, filed on Apr. 2, 2004. The contents of both of the foregoing applications are hereby incorporated by reference in their entirety.

FIELD OF THE INVENTION

The present invention relates to a polarizing transparent viewing element having a zone associated with an obliquely oriented polarizing filter.

BACKGROUND OF THE INVENTION

U.S. Pat. No. 6,250,759 discloses spectacle lenses designed for recreational activities, such as golf, hunting or fishing. Such lenses are divided into several zones, the light transmission characteristics of which are adapted according to the objects or the scene observed when these activities are being practiced. In particular, separate zones of the lens may have different light-filtering characteristics depending on a polarization of said light.

The field of view of a vehicle driver, a motorcyclist or an aircraft pilot has particular characteristics. In particular, it comprises two separate portions. A first portion of the field of view, generally a lower portion of the field, is occupied by the instrument panel of the vehicle or aircraft. The instrument panel often incorporates one or more displays, for example of the liquid-crystal display type. Such displays produce light whose polarization characteristics depend on the technologies used and on the ergonomic choices made by the designers of driver or pilot compartments. In particular, it is possible to consider two display technology families, namely passive-matrix displays and active-matrix displays. In particular, the illumination state of a pixel of the screen corresponds:

- in the case of STN (supertwisted nematic) passive-matrix displays, to the emission of polarized light oriented at an angle of 0°;
- in the case of DSTN (double supertwistednematic) passive-matrix displays, to the emission of polarized light oriented at an angle of +90°; and
- in the case of TFT (thin-film transistor) active-matrix displays, to the emission of polarized light oriented at an angle of +45°.

The abovementioned angles are given relative to a horizontal reference direction. When looking at the observer, the 0° reference direction is oriented to the right and the angles are counted positively in the counterclockwise sense.

The second portion of the field of view is occupied by the external scene, visible through the windshield or directly in the case of a motorcyclist. This second portion of the field in general constitutes an upper portion of the field of view of the driver or pilot. It is therefore located above that portion of the field of view occupied by the instrument panel. The light that comes from the external elements located in this second portion of the field of view is usually unpolarized, that is to say natural light. However, it may also be polarized following a reflection on a transparent surface.

The visibility of the instrument panel displays constitutes a major challenge in the design of driver or pilot compartments. This is because the contrast of the displays is attenuated by the light that enters the driver's compartment or into the cockpit, or which is present around a motorcycle driver, and which illuminates the observer and the instrument panel. It may then be difficult to distinguish between the lit and unlit states of the pixels of the display.

A dark rim is often placed above the displays of the instrument panel in order to reduce the amount of ambient light that illuminates these displays. However, such rims are not very effective, and they are unattractive and bulky. Furthermore, they may impede the accommodation of the driver's or pilot's eye when it moves from the instrument panel to the external visible scene, or conversely from the scene to the instrument panel.

SUMMARY OF THE INVENTION

One object of the present invention therefore consists in improving the visual perception of instrument panel displays and onboard electronic devices, such as for example GPS (global positioning systems) or mobile telephone displays.

To do this, the invention proposes a polarizing transparent viewing element divided into several zones (2a-2c; 5a-5c), at least one of said zones (2a; 5a) being associated with a light-polarizing filter, the light passing through said element being affected differently in two of said zones depending on a polarization direction of said light, the element being characterized in that the polarizing filter is oriented obliquely relative to a horizontal direction in the use position of the element (2; 5) with an angle between the orientation of the filter and the horizontal direction different from 90° and from 0°.

Preferably, the polarizing filter is oriented at 135° since, taking into account the abovementioned angle values and the polarized light emitted by the various displays, a polarizing filter oriented at 135° guarantees that there is no extinction of the onboard displays at 0° and 90°, therefore allowing the driver to read them, and also guarantees enhanced visual perception of onboard active-matrix displays that give light polarized at 45°.

The expression "polarizing transparent viewing element" is understood to mean lenses and eye visors. The term "lenses" is understood to mean all lenses made of mineral or organic material, of variable composition and shape suitable for being fitted into a spectacles frame in order to protect and/or correct one's sight, these lenses being chosen from afocal, unifocal, bifocal, trifocal and progressive lenses. The term "eye visors" is understood to mean any organic material of variable composition and shape that can be fitted into a protector that allows vision. By way of nonlimiting illustration, mention may be made of the eye visor of a mask (for diving, climbing, sport, etc.) and the eye visor of a helmet (for the driver of a vehicle, for protection in speed sports, etc.).

The expression "use position of the polarizing transparent viewing element" is understood to mean the position of this element when it is fitted, in front of the driver's or pilot's eyes, in accordance with the normal use of the element, for a vertical position of his head. The term "vertical" refers to the gravitational vertical. In contrast, the term "horizontal" refers to a direction deviating by an angle of 90° from the gravitational vertical.

The optical center of a lens considered hereafter is often coincident with the geometric center of the lens before machining. More generally, the optical center may be defined in one of the following ways:

the point located on the lens at the middle of two etch marks;

the point representing the prism prescribed for the wearer in distance viewing;

the point indicated on the lens, before it is fitted into the frame, by a cross marked on the lens; or the point through which the optical axis of the lens passes, the optical axis representing the line joining the centers of the two constituent surfaces of the lens.

The expression "orientation of a polarizing filter" is understood to mean the orientation of the electric field of incident light for which the intensity of the light transmitted by this filter is a minimum or zero. Within the context of the invention, only linear polarizations of the light, or linear light polarization components, will be considered.

According to the invention, a polarizing filter oriented obliquely at an angle different from 90° and 0° is placed between the displays of an instrument panel (or onboard electronic equipment) and the driver's or pilot's eyes. In other words, the angle of orientation of the filter relative to the horizontal direction, in the use position of the transparent viewing element, is strictly between 0° and 90°, or strictly between 90° and 180°. A filter oriented in this way eliminates at least some of the light polarization components that are oriented vertically or horizontally. In particular, the ambient light reflected off a display is thus filtered before being perceived by the driver's or pilot's eye. The lit and unlit states of the pixels of the display, which are associated with an obliquely oriented polarization, are then perceived with enhanced contrast. Strict elimination of angles having values of 0° and 90° guarantees that there is no extinction of the pixels of passive-matrix displays.

This increase in the contrast is a maximum when the polarizing filter is oriented perpendicular to the direction of polarization of the light emitted by a pixel of the display in the lit state. It is therefore advantageous, in the case of TFT displays, for the orientation of the polarizing filter, in the use position of the polarizing transparent viewing element, to make an angle of between 125° and 145° to the horizontal direction. Preferably, the orientation of the polarizing filter makes an angle of 135°, therefore guaranteeing transmission of light polarized at 45°.

In a preferred embodiment of the invention, the zone associated with the obliquely oriented polarizing filter is located in a lower portion of the element with respect to its use position. That zone of the element associated with the obliquely oriented filter then corresponds to that portion of the field of view of the driver or pilot in which the instrument panel is located. The improvement in contrast of the displays perceived by the driver or pilot is thus obtained for a normal position of his head in the driving or flying position. This therefore improves the visual comfort while still maintaining a natural driving or flying position.

In one particular embodiment, the zone associated with the obliquely oriented polarizing filter may be adjacent a lower edge of the polarizing transparent viewing element.

The inventors have also determined that a good compromise is obtained when the zone of the element associated with the obliquely oriented polarizing filter has an upper boundary that passes between an optical center of the polarizing transparent viewing element and a point located 20 millimeters below this center in the use position of said element. More particularly, the upper boundary of the zone of the element associated with the obliquely oriented polarizing filter may pass between the optical center and a point located 10 millimeters below this center.

One of the zones of the element, other than that associated with the obliquely oriented polarizing filter, may be associated with no polarizing filter.

The element may also include a zone associated with a polarizing filter oriented horizontally with respect to its use position. A reflection, consisting of horizontally polarized light, is therefore attenuated in such a zone. The risk of the driver or pilot being dazzled by such reflections is therefore decreased. Such a polarizing filter is particularly effective for eliminating troublesome reflections from sheets of water, from ground coverings, especially when they are wet, from sand, snow or ice.

The zone associated with the obliquely oriented polarizing filter may be located, in the use position of the element, below the zone associated with the horizontally oriented polarizing filter. Such a configuration of the optical surface is particularly adapted to the characteristics of the driver's or pilot's field of view. This is because the reflections attenuated by the horizontally oriented filter emanate from the external scene located in the upper portion of his field of view.

The element may also comprise more than two zones. In particular, it may further include at least one additional zone associated with a polarizing filter oriented vertically with respect to the use position of the element. Reflections consisting of vertically polarized light are therefore attenuated in such an additional zone. These are especially reflections off transparent vertical surfaces, such as for example car windows. The risk of the driver being dazzled by these reflections is therefore also reduced.

Preferably, the additional zone associated with a vertically oriented polarizing filter is located in a lateral portion of the element with respect to its use position. This is because reflections off vertical walls are mainly located in the lateral portions of the driver's field of view, especially when these reflections come from windows bordering a road along which the driver is driving, or from windows of vehicles located to the right and/or to the left of the driver. If the polarizing transparent viewing element is a lens as defined above, said additional zone extends over a width going from the external lateral edge of said lens to a point at a distance of between 5 millimeters (mm) and 75 millimeters (preferably between 5 mm and 30 mm) therefrom, measured along a straight line going from said external lateral edge toward the optical center, as defined above, of said lens.

Optionally, the element may include two additional zones associated with respective polarizing filters oriented vertically with respect to its use position. The two additional zones are located in opposed lateral portions of said element. The resulting protection against being dazzled by reflections off vertical walls is thus symmetrical for the two, right and left, lateral portions of the driver's field of view.

Said two additional zones associated with a vertically oriented polarizing filter are preferably positioned so as to be adjacent a lateral edge of the optical element. They are separated by a distance of between 10 millimeters and 60 millimeters (mm) in a central portion of said element when said optical element represents a lens as defined above. Preferably, the distance between each of the additional zones is between 10 mm and 40 mm, and very preferably the distance is between 20 mm and 40 mm in a central portion of said element.

The invention also relates to a viewing device incorporating at least one transparent viewing element as described above.

The viewing device may comprise a pair of spectacles. The polarizing transparent viewing element then constitutes a lens of said pair of spectacles.

The viewing device may also comprise a helmet, for example a motor cyclist's or pilot's helmet. The visor of the helmet is then formed by the polarizing transparent viewing element.

The viewing device may also be a mask having two separate glasses or a single glass, depending on the function of the mask. This may in particular be a driver's mask suitable for driving convertibles, or boats, such as small off-shore crafts. The visor of the mask is then formed by the polarizing transparent viewing element.

It will be clearly understood by those skilled in the art that, in the case of a visor, it will be sufficient to take measurements, relative to the position and to the width of the zones on the polarizing transparent viewing element, in order to take into account the wearer's pupilary distance.

BRIEF DESCRIPTION OF THE DRAWINGS

Other features and advantages of the present invention will become apparent in the following description of three non-limiting embodiments, with reference to the appended drawings in which:

FIG. 1b (FIG. 1b) illustrates one use of a pair of spectacles according to FIG. 1a in an automobile driver situation;

FIG. 1c (FIG. 1c) shows a frame of reference for the illustration of FIG. 1b;

DETAILED DESCRIPTION OF THE PREFERRED EMBODIMENTS

Figure 1A:
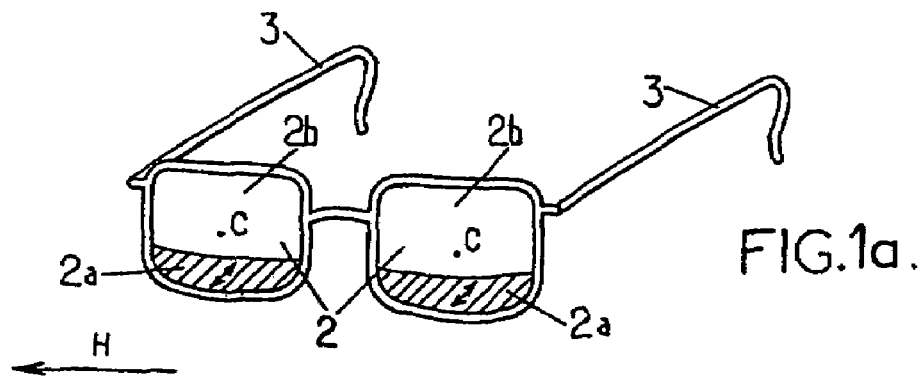
FIG. 1a (FIG. 1a) shows a pair of spectacles provided with lenses according to a first embodiment of the invention.

Referring to FIG. 1, a pair of spectacles comprises a frame 1 with two sides 3, which is equipped with two lenses 2. The word "lens" is considered in its normal usage as defined above.

Such a lens may be only a support for a polarizing filter. In this case, the two faces of the lens are parallel so as to introduce no image distortion. This may also be a lens having an ophthalmic correction action, irrespective of the nature of the correction (myopia, astigmatism, hypermetropia, presbyopia) and this may be, for example, an afocal, unifocal, bifocal, trifocal or progressive lens. The lens may also be associated with other optical functions, such as a solar-protection lens or a photochromic lens.

The lenses 2 are divided into two zones, referenced 2a and 2b. The zone 2a lies near the lower edge of each lens with respect to the use position of the pair of spectacles. The zone 2b lies above the zone 2a. It is located near the upper edge of each lens 2.

For each of the lenses 2, the boundary between the zones 2a and 2b may pass between the optical center of the lens, denoted by C in FIG. 1, and a point located 20 millimeters below the center C. Preferably, it may pass at 10 millimeters below the center C. Such a position of the boundary between the zones 2a and 2b of the lens 2 is particularly suitable for the positioning of the various elements present in the field of view of the driver of a vehicle.

The zone 2a of each lens is associated with a polarizing filter oriented at about 135° to a horizontal direction H. The orientation of the filters is indicated by a double-headed arrow in FIG. 1. Each polarizing filter may be produced using one of the technologies known to those skilled in the art, for example by "scracthage". This may be a filter for absorbing vertically polarized light or possibly a filter for reflecting vertically polarized light.

In this first embodiment, the zone 2b of each lens 2 has no polarizing filter.

Light incident on the zone 2a of one of the lenses 2 is filtered according to its polarization—it is absorbed by the filter if it is polarized parallel to the orientation direction of the filter, while it is transmitted by the filter if it is polarized perpendicular to the orientation direction of the filter.

FIG. 1b illustrates an automobile driver wearing a pair of spectacles as shown in FIG. 1a. For the sake of clarity, the outline of the driver is drawn by dotted lines. The driver's head faces the windshield 101, through which the road 102 is visible, and also elements of the scene on each side of the road 102, for example windows 103. A display 100, for example of the active-matrix liquid crystal type (such as a GPS display) is located in front of the driver, in the instrument panel of the vehicle. Driving information is displayed on the display 100, such as the path followed by the vehicle between its starting point and its arrival point, by the pixels of the display 100 being driven so that some of these pixels emit light polarized at 45°. This polarization direction is defined with respect to the horizontal reference direction H indicated in FIG. 1b. The direction H is directed toward the driver's right.

The orientation of the polarizing filter associated with the zone 2a of each of the lenses 2 of the pair of spectacles worn by the driver is indicated in FIG. 1b—each of the filters is oriented at 135° to the direction H locally on each lens. The orientation of the polarizing filters associated with each zone 2a is therefore perpendicular to the polarization direction of the light emitted by the display 100. Each obliquely oriented filter eliminates the light polarized at 135° to the direction H (see FIG. 1c) so that the driver essentially perceives light polarized at 45° to the direction H. Such an orientation of the filters associated with the zones 2a is consequently suitable for transmitting more particularly the light emitted by the display 100.

Figure 2:
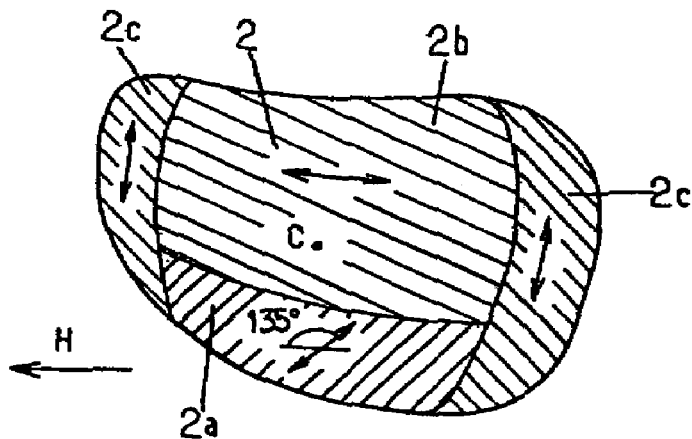
FIG. 2 (FIG. 2) shows a spectacles lens according to a second embodiment of the invention.

FIG. 2 illustrates an improvement of the invention, applied to a spectacles lens 2 that can be used with the frame 1 described above. The arrow indicated in FIG. 2 indicates the horizontal reference direction H introduced above, directed in the same way toward the right of a person wearing the lens 2.

The lens 2 comprises the previous zones 2a and 2b. The zone 2a is again associated with a polarizing filter oriented at 135° to the direction H while the zone 2b, placed above the zone 2a of the lens 2, is associated with a polarizing filter oriented horizontally in the use position of the lens 2, that is to say parallel to the direction H.

It is known that reflections off a transparent horizontal surface consist essentially of horizontally polarized light. Such reflections may come, for example, from the surface of the road 102 lying in front of the driver, especially when the road 102 is wet (see FIG. 1b). Such a reflection causes the driver to be visually impeded, and may even dazzle him, which can be dangerous in certain driving circumstances. FIG. 1b illustrates such a reflection, denoted by R1. The reflection R1 is located in the upper portion of the driver's field of view, which corresponds to the zone 2b of each of the lenses 2 of the driver's pair of spectacles. The horizontally oriented polarizing filter associated with the zone 2b of each lens 2 eliminates, or reduces, the perception of the reflection R1 by the driver. Driving comfort is therefore increased, as is the driving safety.

Similarly, reflections off a vertical surface have a vertical light polarization. FIG. 1b shows a reflection R2 off a window 103 bordering the road 102. The reflection R2 is perceived by the driver in a lateral portion of his field of view, when he keeps his head facing the road. The perception of the reflection R2 by the driver may be eliminated, or reduced, by providing at least one lateral zone associated with a vertically oriented polarizing filter in each of the lenses 2. The lens 2 shown in FIG. 2 incorporates two lateral zones referenced 2c, each associated with a vertically oriented polarizing filter. The two zones 2c are each located near one of the opposed lateral edges of the lens 2, that is to say near the left edge and the right edge of the lens 2, respectively. The distance between the respective boundaries of the two zones 2c located toward the center C, measured at the height of the center C, may be between 10 millimeters and 60 millimeters. Preferably, this distance is between 20 millimeters and 40 millimeters.

The lens 2 is thus divided into four separate main zones, namely a lower central zone 2a associated with a polarizing filter oriented at 135° to the direction H, an upper central zone 2b associated with a horizontally oriented polarizing filter, and two opposed lateral zones 2c associated with respective vertically oriented polarizing filters. Thus, using a pair of spectacles equipped with lenses as shown in FIG. 2, the driver sees the display 100 with optimum contrast, while still being protected both against being dazzled by reflections off the surface of the road located in front of him and against reflections off vertical walls located laterally in his field of view.

Figure 3:
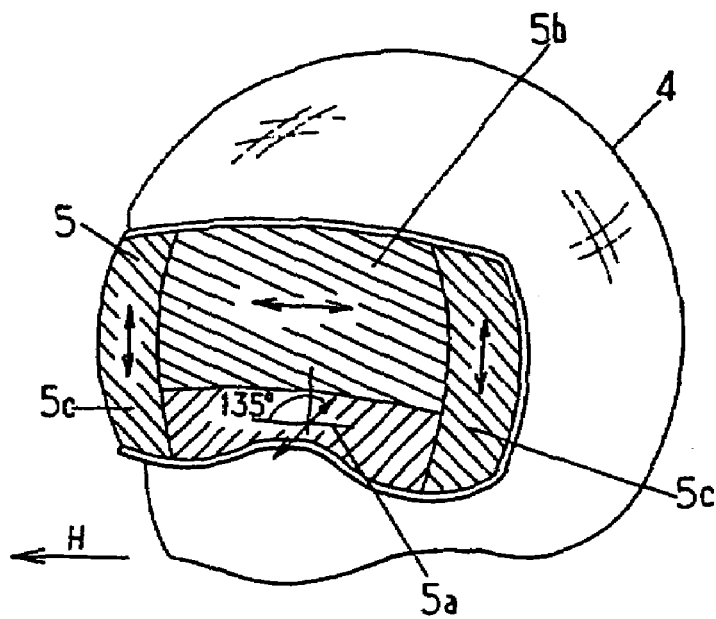
FIG. 3 (FIG. 3) shows a helmet provided with an eye visor according to another embodiment of the invention.

FIG. 3 shows a motorcyclist's helmet 4 having a visor 5, for example made of polyimide. The visor 5 may consist of a flexible transparent wall. The visor 5 comprises two zones 5a and 5b located one below the other, near the lower and upper edges of the visor 5 respectively. The zone 5a is associated with a polarizing filter oriented at 135° to the horizontal direction H. As previously, the direction H is directed toward the right of the driver, i.e. the motor cyclist wearing the helmet 4. The visor further includes two other zones 5c located on each side of the zones 5a and 5b. The zones 5c are each associated with a vertically oriented polarizing filter. The visor of the helmet 4 therefore makes it possible to eliminate reflections off the surface of the road, or off vertical walls located on each side of the road, when the visor is used in the driving position.

Of course, the improvements described for a spectacles lens in relation to FIGS. 1a, 1b and 2 may be transposed to the visor 3 of FIG. 3. They may be transposed in the same way to any polarizing transparent viewing element falling within the scope of the present invention.

Many variants may be introduced into the embodiments described above.

Among these, the zones of the viewing element may be modified, by modifying the shape of the boundaries of each zone. In particular, these boundaries may be straight or curved.

The invention claimed is:

1. A polarizing transparent viewing element, having an optical surface divided into several zones associated with respective light-polarizing filters, light passing through said element being affected differently in two of said zones depending on a polarization direction of said light wherein:

the orientation of the polarizing filter of a first zone of the several zones is oblique relative to a horizontal direction in an use position of the element with an angle between the orientation of the filter and the horizontal direction different from 90° and from 0°, said first zone being located in a lower portion of the optical surface with respect to the use position of the element;

a second zone of the several zones is associated with a polarizing filter oriented horizontally with respect to the use position of the element, the first zone associated with the obliquely oriented polarizing filter being located, in the use position of the element, below the second zone associated with the horizontally oriented polarizing filter; and two third zones of the several zones being associated with a polarizing filter oriented vertically with respect to the use position of the element, said two third zones being located in opposed lateral portions of the element with respect to the use position of the element, and being spaced apart from each other with a non-zero separating distance, and said first zone and said second zone being located between the two third zones along a respective horizontal line extending between one of the third zones and the other of the third zones.

2. The element as claimed in claim 1, in which the oblique orientation of the polarizing filter of the first zone in the use position of the element makes an angle of between 125° and 145° said horizontal direction.

3. The element as claimed in claim 2, in which the oblique orientation of the polarizing filter of the first zone in the use position of the element makes an angle of 135° to said horizontal direction.

4. The element as claimed in claim 1, in which the first zone associated with the obliquely oriented polarizing filter is adjacent a lower edge of the element.

5. The element as claimed in claim 1, in which an upper boundary of the first zone associated with the obliquely oriented polarizing filter passes between an optical center of said element and a point located 20 millimeters below said center in the use position of the element.

6. The element as claimed in claim 5, in which the upper boundary of the first zone associated with the obliquely oriented polarizing filter passes between an optical center of said element and a point located 10 millimeters below said center in the use position of the element.

7. The element as claimed in claim 1, in which at least one of the third zones associated with the vertically oriented polarizing filter extends over a width going from an external lateral edge of said element to a point at a distance of between 5 mm and 75 mm therefrom, measured along a straight line going from said lateral edge toward the optical center of said element.

8. The element as claimed in claim 7, in which said at least one of the third zones extends over a distance of between 5 mm and 30 mm.

9. The element as claimed in claim 1, in which the two third zones associated with the vertically oriented polarizing filters are separated by a distance of between 10 mm and 60 mm in a central portion of said element.

10. The element as claimed in claim 9, in which the two third zones associated with the vertically oriented polarizing filters are separated by a distance of between 10 mm and 40 mm in the central portion of said element.

11. The element as claimed in claim 10, in which the two third zones associated with the vertically oriented polarizing filters are separated by a distance of between 20 mm and 40 mm in the central portion of said element.

12. A viewing device incorporating at least one polarizing transparent viewing element, said polarizing transparent viewing element having an optical surface divided into several zones associated with respective light-polarizing filters, light passing through said element being affected differently in two of said zones depending on a polarization direction of said light, wherein:

the orientation of the polarizing filter of a first zone of the several zones is oblique relative to a horizontal direction in an use position of the element with an angle between the orientation of the filter and the horizontal direction different from 90° and from 0°, said first zone being located in a lower portion of the optical surface with respect to the use position of the element;

a second zone of the several zones is associated with a polarizing filter oriented horizontally with respect to the use position of the element, the first zone associated with the obliquely oriented polarizing filter being located, in the use position of the element, below the second zone associated with the horizontally oriented polarizing filter; and two third zones of the several zones being associated with a polarizing filter oriented vertically with respect to the use position of the element, said two third zones being located in opposed lateral portions of the element with respect to its use position, and being spaced apart from each other with a non-zero separating distance, and said first zone and said second zone being located between the two third zones along a respective horizontal line extending between one of the third zones and the other of the third zones.

13. The viewing device as claimed in claim 12, comprising a pair of spectacles and wherein said polarizing transparent viewing element constitutes a lens of said pair of spectacles.

14. The viewing device as claimed in claim 12, comprising a helmet and wherein said polarizing transparent viewing element constitutes a visor of said helmet.

15. The viewing device as claimed in claim 12, comprising a mask and wherein said polarizing transparent viewing element constitutes a visor of said mask.

* * * * *

UNITED STATES PATENT AND TRADEMARK OFFICE
CERTIFICATE OF CORRECTION

PATENT NO.        : 7,656,581 B2
APPLICATION NO.   : 10/594604
DATED             : February 2, 2010
INVENTOR(S)       : Guillame Giraudet It is certified that error appears in the above-identified patent and that said Letters Patent is hereby corrected as shown below:

Please amend Claim 2 locates in column 8 line 17 to read as follows:
--2. The element as claimed in claim 1, in which the oblique orientation of the polarizing filter of the first zone in the use position of the element makes an angle of between 125° and 145° to said horizontal direction.--

Signed and Sealed this

Twenty-seventh Day of April, 2010

David J. Kappos
*Director of the United States Patent and Trademark Office*